United States Patent
Drouin

(10) Patent No.: US 10,306,292 B2
(45) Date of Patent: May 28, 2019

(54) METHOD AND SYSTEM FOR TRANSITIONING BETWEEN A 2D VIDEO AND 3D ENVIRONMENT

(71) Applicant: Unity IPR ApS, Copenhagen (DK)

(72) Inventor: Sylvio Herve Drouin, San Francisco, CA (US)

(73) Assignee: Unity IPR ApS, Copenhagen K (DK)

( * ) Notice: Subject to any disclaimer, the term of this patent is extended or adjusted under 35 U.S.C. 154(b) by 234 days.

(21) Appl. No.: 15/080,536

(22) Filed: Mar. 24, 2016

(65) Prior Publication Data

US 2016/0286208 A1    Sep. 29, 2016

Related U.S. Application Data

(60) Provisional application No. 62/137,709, filed on Mar. 24, 2015.

(51) Int. Cl.

| | | |
|---|---|---|
| H04N 13/04 | (2006.01) | |
| H04N 21/43 | (2011.01) | |
| H04N 21/81 | (2011.01) | |
| H04N 21/8547 | (2011.01) | |
| H04N 13/194 | (2018.01) | |
| H04N 13/106 | (2018.01) | |
| H04N 13/111 | (2018.01) | |
| H04N 13/178 | (2018.01) | |

(52) U.S. Cl.
CPC ....... *H04N 21/4307* (2013.01); *H04N 13/111* (2018.05); *H04N 13/158* (2018.05); *H04N 13/178* (2018.05); *H04N 13/194* (2018.05); *H04N 21/816* (2013.01); *H04N 21/8547* (2013.01)

(58) Field of Classification Search
CPC .......... H04N 13/0011; H04N 13/0059; H04N 13/0066; H04N 21/4307; H04N 21/816; H09N 13/0044
USPC .......................................................... 348/51
See application file for complete search history.

(56) References Cited

U.S. PATENT DOCUMENTS

| | | | | |
|---|---|---|---|---|
| 6,285,368 | B1 * | 9/2001 | Sudo ...................... | G09G 3/003 345/418 |
| 2004/0027267 | A1 * | 2/2004 | Rousso .............. | H04N 13/0033 342/1 |
| 2007/0296721 | A1 * | 12/2007 | Chang .................... | G06T 15/10 345/427 |
| 2012/0329527 | A1 * | 12/2012 | Kang ................... | H04N 13/349 455/566 |

(Continued)

*Primary Examiner* — Christopher G Findley

(74) *Attorney, Agent, or Firm* — Schwegman Lundberg & Woessner, P.A.

(57) ABSTRACT

A system includes one or more hardware processors, a display device, a memory storing 2-dimensional (2D) content and 3-dimensional (3D) content associated with a content item, and a playback engine. The playback engine is configured to receive the 2D content, the 2D content including one or more reference identifiers (IDs), display the 2D content on the display device for a user and, during display of the 2D content, receive an indication of a transition event. The playback engine is also configured to determine a transition reference identifier (ID) from the one or more reference IDs, identify the 3D content based on the transition reference ID, render a 3D environment based on the 3D content, and transition the display device from the displaying the 2D content to the 3D environment.

17 Claims, 9 Drawing Sheets

(56) References Cited

U.S. PATENT DOCUMENTS

2015/0231503 A1\* 8/2015 Kruglick ................ A63F 13/65
                                                                463/31

\* cited by examiner

METHOD AND SYSTEM FOR TRANSITIONING BETWEEN A 2D VIDEO AND 3D ENVIRONMENT

CROSS-REFERENCE TO RELATED APPLICATIONS

This application claims the benefit of priority to U.S. Provisional Patent Application Ser. No. 62/137,709, filed Mar. 24, 2015, herein incorporated by reference in its entirety.

TECHNICAL FIELD

The present disclosure relates generally to the fields of two-dimensional (2D) video, three-dimensional (3D) animation, and virtual reality and, more specifically, to systems and methods for transitioning between 2D and 3D environments.

BACKGROUND

In recent years there has been a push towards online video generation and distribution with successful sites such as YouTube® and the like. The content of these videos are usually live video recordings, but some digitally animated movies are also present, with the quality of the videos ranging from amateur to professional. Accordingly, there has been an increase in technology that allows both professional and amateur users to create virtual animation movies and have them combined with live video (e.g., using chroma-keying or blue/green screen technology). While the success of YouTube has increased video traffic on the internet considerably and has shifted at least some control of content to the user, the experience of watching a video online remains similar to watching a video on television. The consumer's viewing experience remains primarily a passive one, consisting mainly of pressing play and watching.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
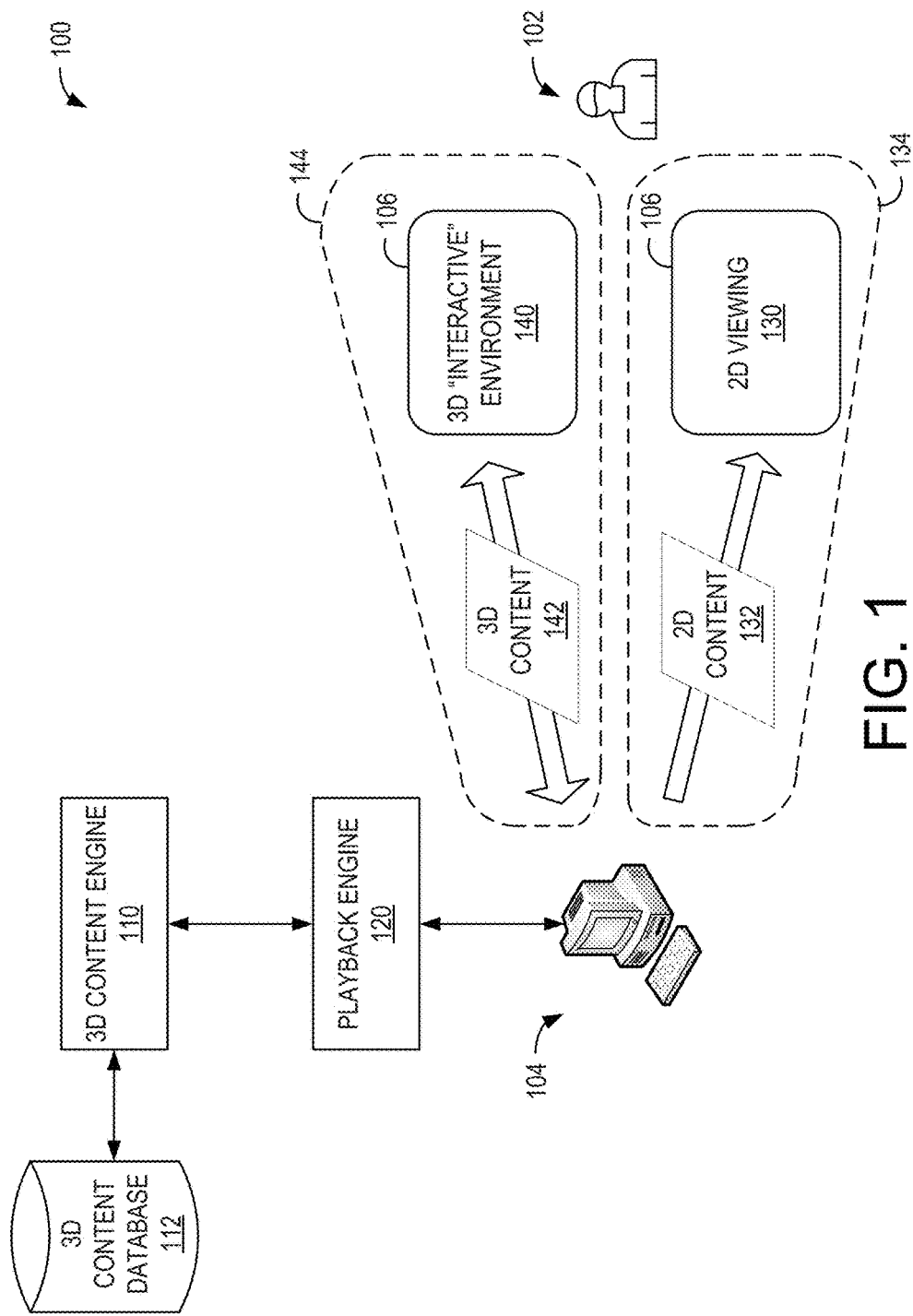
FIG. 1 is a network diagram of an example playback system for transitioning between 2D and 3D environments.

There is described herein systems and methods for transitioning between 2D and 3D environments. A playback system enables a user (or "consumer" of content) to transition between 2D and 3D environments while consuming (e.g., viewing) a content item. The content item may include, for example, 2D video, or 360 degree video (also known as "immersive videos" or "spherical videos"), which effectively presents a 2D view of a 3D "world" (e.g., real or otherwise). During viewing of the content item, the playback system enables the user to initiate a transition from a 2D viewing context ("2D mode") (e.g., viewing of the 2D video/audio) to a 3D environment ("3D mode") representative of the 3D world depicted in the 2D content. While in the 3D mode, the playback system enables the user to "move around" or "walk through" the 3D environment (e.g., via 3D controls allowing the user to navigate freely through the 3D scene). For example, the user may change the perspective from which the user views objects within the 3D environment at the moment at which the 2D viewing was paused, moving around to the back side of an object, or rotating to see other objects not visible in the current 2D frame. Such functionality increases user interactivity during the content engagement experience while, for example, watching downloaded or streamed video content.

More specifically, the content item includes a 2D component and an associated 3D component. The 2D component may be, for example, a 2D video depicting a scene within a house, or rooms within a building. The 3D component may include 3D information (or "3D data") associated with that scene, such as object data defining the walls, floors, and other objects within the environment. The 2D component may be relatively small in size (e.g., streaming 2D video content), where the 3D component may be relatively large in size (e.g., object data associated with the many objects or surfaces appearing within the environment).

Downloading all the 3D information associated with an entire 2D video may not be feasible in certain computing or networking environments. As such, in some embodiments, the playback system stores the information required to generate the 3D environment (e.g., the 3D component) within a database such as to have the 3D component available "on demand." When a transition is initiated (e.g., from the 2D video to the 3D environment), then the appropriate 3D information (e.g., for the chosen 2D frame) is downloaded and converted by the playback system into a 3D environment within which the user can navigate.

To enable such "on demand" transitions into the 3D environment, in some embodiments, the playback system links the 2D component and the 3D component with reference identifiers (IDs) (e.g., ID numbers, timestamps, pointers, or the like). The reference IDs link positions within the 2D content (e.g., a particular frame in the 2D video) with associated elements of the 3D content (e.g., the 3D component for that frame, the information required to construct the 3D virtual environment containing all the objects in that linked 2D frame, including elements that may not be visible in the 2D frame). The 3D component may include, for example, the geometry, color, texture, and the like of the objects and background within the scene. Further, the 3D component may include a geometry "map" that describes the 3D location and orientation of the objects as well information required for rendering.

During operation, the playback system downloads (e.g., to a device of the user) the 2D component and associated reference IDs, and presents (e.g., plays) the 2D component to the user (e.g., a 2D playback engine presenting the 2D content via a display of the user device). The 2D component may include a mechanism (e.g., a button displayed as an overlay on the 2D content) that allows the user to initiate a transition to 3D content. Upon initiation of the transition to 3D content, the reference ID at or near the current point of viewing within the 2D component is used to identify the 3D component (e.g., the 3D information needed based on the one frame chosen by the user). As such, data transfer may be substantially reduced, thereby reducing bandwidth requirements and allowing for more efficient transitions between the 2D and 3D modes.

At the time of the transition request, the playback system requests the 3D component (e.g., 3D scene data) associated with that reference ID (e.g., from a remote database using a remote procedure call (RPC) to access web services (for example XMLRPC)). The 3D component is stored on the server in an appropriate format (e.g., Filmbox (FBX) file format or other similar format compatible with 3D animation data). Once the 3D component is downloaded (or streamed), a local 3D rendering engine generates the 3D environment. A user interface (UI) engine manages control of the display, coordinates releasing control of the display from the 2D engine to the 3D engine, and vice-versa, and presents user controls to the user (e.g., for navigation and other functionality within the 3D environment).

For example, the 2D playback engine may be a video media player responsible for preparing the 2D video content for display, performing such operations on the data as decompression, conversion, formatting, and the like. The 2D playback engine may be, for example, a Flash-based player, and the control release may be handled with JavaScript commands. The transfer of control for the display may be achieved without closing the 2D playback engine to allow the last video frame to remain visible on the display while the preparation of the 3D environment is completed. This may include, for example, downloading the 3D component, constructing the 3D scene via the 3D engine, and displaying the 3D scene via the display device. This allows for smooth transitions between the 2D and 3D environments.

After generating the 3D environment, the 3D rendering engine fades the view of the 3D environment on top of the stopped 2D video image on the display. The view into the 3D environment is constructed using the same resolution, aspect ratios, lighting, and the like from the 2D image such that the view into the 3D environment resembles the 2D image and, thus, will appear to have had a smooth transition from the user's perspective. For example, this transition may happen completely in a virtual reality headset wherein the user transitions from watching a 360 degree video to a full 3D virtual reality environment. Once this transition phase is completed, the viewer may (e.g., through virtual reality headset positional tracking, keyboard controls, mouse, or other input devices) move around in all 6 degrees of freedom (e.g., translation and rotation) and explore the scene via the 3D environment, linking specific input device controls to movements of a 3D virtual camera that provides a user with a view into the 3D environment.

It should be understood that the term "2D video," as used herein, may include both standard 2D video, as well as 360 degree video (also sometimes referred to in the art as "immersive videos"), which may include 360 degree panorama views. In 360 degree videos, the user may have control over the viewing orientation (e.g., via a mouse, or orientation tracking of a phone or head-mounted display, to alter the view). It should also be understood that the term "3D environment," as used herein, refers to a computerized, virtual environment such as those provided by 3D gaming engines, and may include virtual reality (VR) environments (e.g., presented via head-mounted displays).

FIG. 1 is a network diagram of an example playback system 100 for transitioning between 2D and 3D environments. In the example embodiment, the playback system 100 includes a playback engine 120 that presents 2D content 132 and 3D content 142 to a user 102 via a personal computing device 104 (e.g., a personal computer, laptop, mobile phone, a wearable computing device, or the like). The 2D content 132 may include, for example, video or video/audio content, such as episodes of a television (TV) show, or a movie, or a YouTube video, or an animated video.

The user 102 views the content 132, 142 via a display device 106 of the computing device 104 (e.g., a conventional display screen, a touch-screen, a head-mounted display, or the like). It should be understood that two displays 106 are illustrated in FIG. 1 for purposes of explanation, and the displays 106 are meant to illustrate different uses of a single display 106, as described herein. In some embodiments, the playback system 100 may utilize multiple displays 106. For example, the playback system 100 may present the 2D viewing 130 on a computer screen or hand-held device display, and then transition to presentation of the 3D environment 140 on a virtual reality (VR) headset attached to the computing device 104.

The playback system 100 also includes a 3D content engine 100 in communication with a 3D content database 112 and the playback engine 120. The 3D content engine 110 provides 3D content 142 to the playback engine 120. Elements of the 3D content 142 may be stored in the 3D content database 112. The playback engine 120 includes a 3D rendering engine (not separately shown in FIG. 1) that provides the 3D environment 140 (e.g., rendering objects such as walls, ground, trees, doors, and so forth), and enables the user 102 to move through or interact with the 3D environment 140.

In the example embodiment, the playback engine 120 executes on the personal computing device 104, and the 3D content engine 110 executes on a server device (not separately shown) (e.g., an Internet-based video service). The playback engine 120 is coupled in networked communication with the 3D content engine 110 such that the 3D content engine 110 may provide the 3D content 142 (e.g., upon request) to the playback engine 120.

In the example embodiment, the 2D content 132 and the 3D content 142 are related. More specifically, the 3D content 142 includes objects, and their relative arrangements, such as to approximate the 2D content 132. For example, the 2D content 132 may be a video of a person walking through a kitchen. In the video, the kitchen includes stationary objects such as walls, ceiling and floor, cabinets above a sink, a refrigerator and a stove against one wall, and a table with two chairs in the middle of the kitchen. As such, the 3D content 142 may include 3D objects for each of the objects in the kitchen. Further, the 3D content 142 may also define relative positions for each of those 3D objects such that, when rendered by a 3D rendering engine (not separately shown in FIG. 1), the 3D content 142 may appear substantially as in the 2D content 132. In other words, when the 3D objects are rendered by the 3D rendering engine, the walls, ceiling and floor appear as seen in the 2D content, and the cabinets appear above the sink, and the refrigerator and stove appear against one wall, and the table and two chairs appear in the middle of the room. As such, the 2D content 132 may be referred to herein as a "2D component," and the 3D content 142 may be referred to herein as a "3D component" of a content item.

The playback system 100 enables transition between 2D viewing 130 and the 3D interactive environment (or just "3D environment") 140. More specifically, during operation, the playback engine 120 provides 2D viewing 130 of the 2D content 132 to the user 102 (e.g., playing a video on the display 106). At some point during the 2D viewing 130, a transition event is initiated. For example, the playback engine 120 may enable the user to initiate the transition event (e.g., by pressing a key, or other user-initiated input action), or the playback engine 120 may automatically initiate the transition event (e.g., at a particular point in the 2D content 132). In some embodiments, the 2D content 132 may include a transition initiation marker that automatically initiates the transition event (e.g., when the 2D viewing 130 reaches the marker).

Once the transition event is initiated, the playback system 100 interrupts the 2D viewing 130 of the 2D content 132 on the display 106 and begins presenting the 3D content 142 to the user 102 through the display 106. In other words, the 2D viewing 130 of the 2D content 132 transitions to the 3D interactive environment 140, which presents the 3D content 142 via the display 106, along with other interactive input commands for the user 102. The 2D viewing 130 of 2D content 132 may be referred to herein as "2D mode" 134, whereas interacting within the 3D environment 140 may be referred to herein as "3D mode" 144. Transitioning between 2D mode 134 and 3D mode 144 is described in greater detail below.

Figure 2:
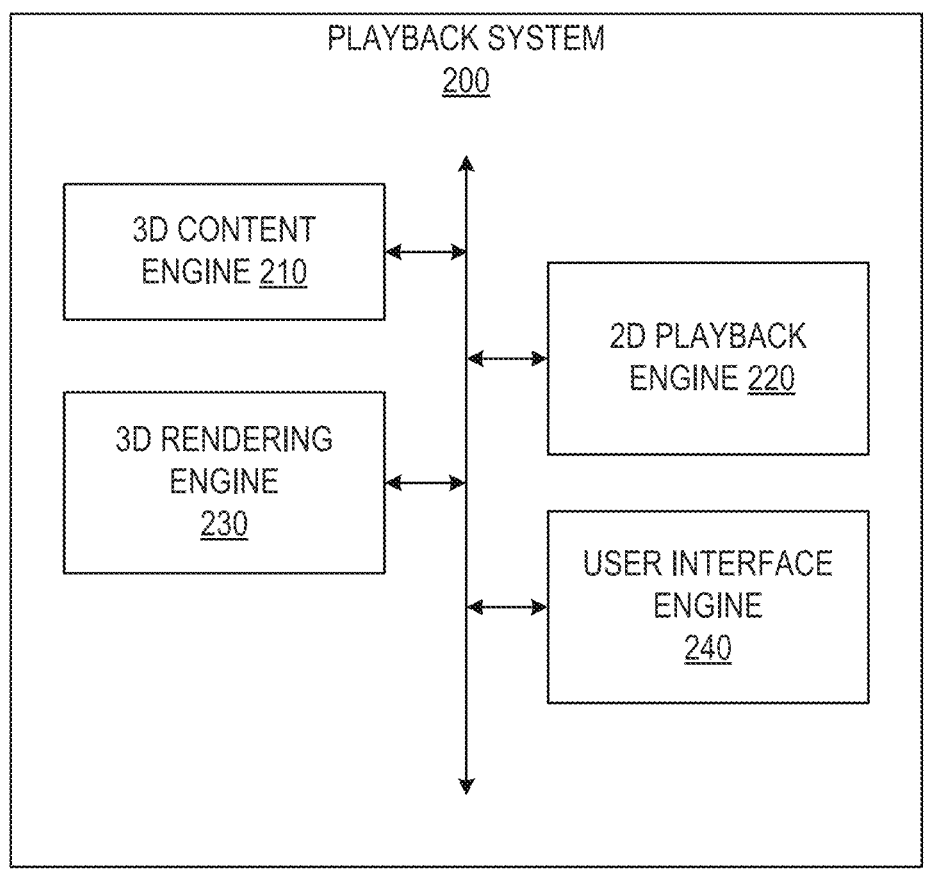
FIG. 2 illustrates a playback system for transitioning between the 2D mode and the 3D mode.

FIG. 2 illustrates a playback system 200 for transitioning between the 2D mode 134 and the 3D mode 144. In some embodiments, the playback system 200 may be similar to the playback system 100. In the example embodiment, the playback system 200 includes a 3D content engine 210, a 2D playback engine 220, a 3D rendering engine 230, and a user interface engine 240. In some embodiments, each of the engines 210, 220, 230, 240 may be executed by a single computing device (e.g., the personal computing device 104). In other embodiments, the engines 210, 220, 230, 240 may operate across multiple devices.

The 3D content engine 210 prepares the 2D content 132 and the 3D content 142 for use in transition events, and provides the 2D content 132 3D content 142 during transition events. In the example embodiment, prepares the 2D content and 3D content by associating elements of the 2D content with elements of the 3D content through use of reference identifiers (IDs). During a transition event, the 3D content engine 210 retrieves the 3D content 142 from the 3D content database 112 and transmits the 3D content 142 to the 3D rendering engine 230 (e.g., upon initiation of a transition event). In other words, the associated 3D content 142 may be pre-determined and "staged" for later use, and may be transferred upon request. In other embodiments, the 3D content engine 210 may determine some or all of the 3D content 142 through analysis of the 2D content 132 (e.g., using known methods for 3D object extraction from 2D videos).

The 2D playback engine 220 presents the 2D content 132 to the user 102 (e.g., via the display 106). The 2D playback engine 220 may also provide the user 102 with an input action (e.g., clicking a button) that enables the user 102 to initiate a transition event (e.g., from 2D mode to 3D mode, or vice versa). The 2D playback engine 220 may be, for example, a video media player responsible for preparing the 2D video content for display, performing such operations on the data as decompression, conversion, formatting, and the like. The 2D playback engine may be, for example, a Flash-based player, and the control release may be handled with JavaScript commands. The transfer of control for the display 106 may be achieved without closing the 2D playback engine 220, allowing the last video frame to remain visible on the display while the preparation of the 3D environment 140 is completed. This may include, for example, downloading the 3D component, constructing the 3D scene via the 3D rendering engine 230, and displaying the 3D scene via the display device 106. This allows for smooth transitions between the 2D mode 134 and the 3D mode 144.

Upon initiation of the transition event, the 3D rendering engine 230 retrieves the 3D content 142 associated with the 2D content 132 (e.g., from the 3D content engine 210) and renders the 3D environment with the 3D content 142. The 3D environment is then displayed to the user 102 (e.g., via the display 106), replacing the view of the 2D content 132. More specifically, and in the example embodiment, the 3D rendering engine 230 orients the initial view of the 3D environment such that the 3D environment appears substantially as seen in the 2D content at the time the transition event is initiated. As such, the user 102 perceives stopping the 2D content 132 and transitioning into the 3D environment seamlessly (e.g., starting with the same perspective).

The user interface engine 240 provides navigation controls to the user 102 such that the user 102 may navigate through the 3D environment, changing view position and orientation in six degrees of freedom (e.g., in three degrees of translation, and three degrees of rotation). In conjunction with the 3D rendering engine 230, the user 102 may move about the 3D environment, seemingly "paused" and moving about the environment depicted in the 2D content at the time the transition event was initiated. Further, in some embodiments, reference IDs are sent to the user interface engine 240. The user interface engine 240 may provide visible interface with the user 102 through the display 106, may control, at the behest of the user 102, the transition from the 2D playback engine 220 to the 3D rendering engine 230 and vice versa, may manage the navigation controls for the 3D environment, may link the reference IDs with the displayed video frames such that when the user 102 stops the video playback and initiates a transition event, the user interface engine 240 may request 3D data that corresponds to the appropriate reference ID from the stopped video.

Figure 3:
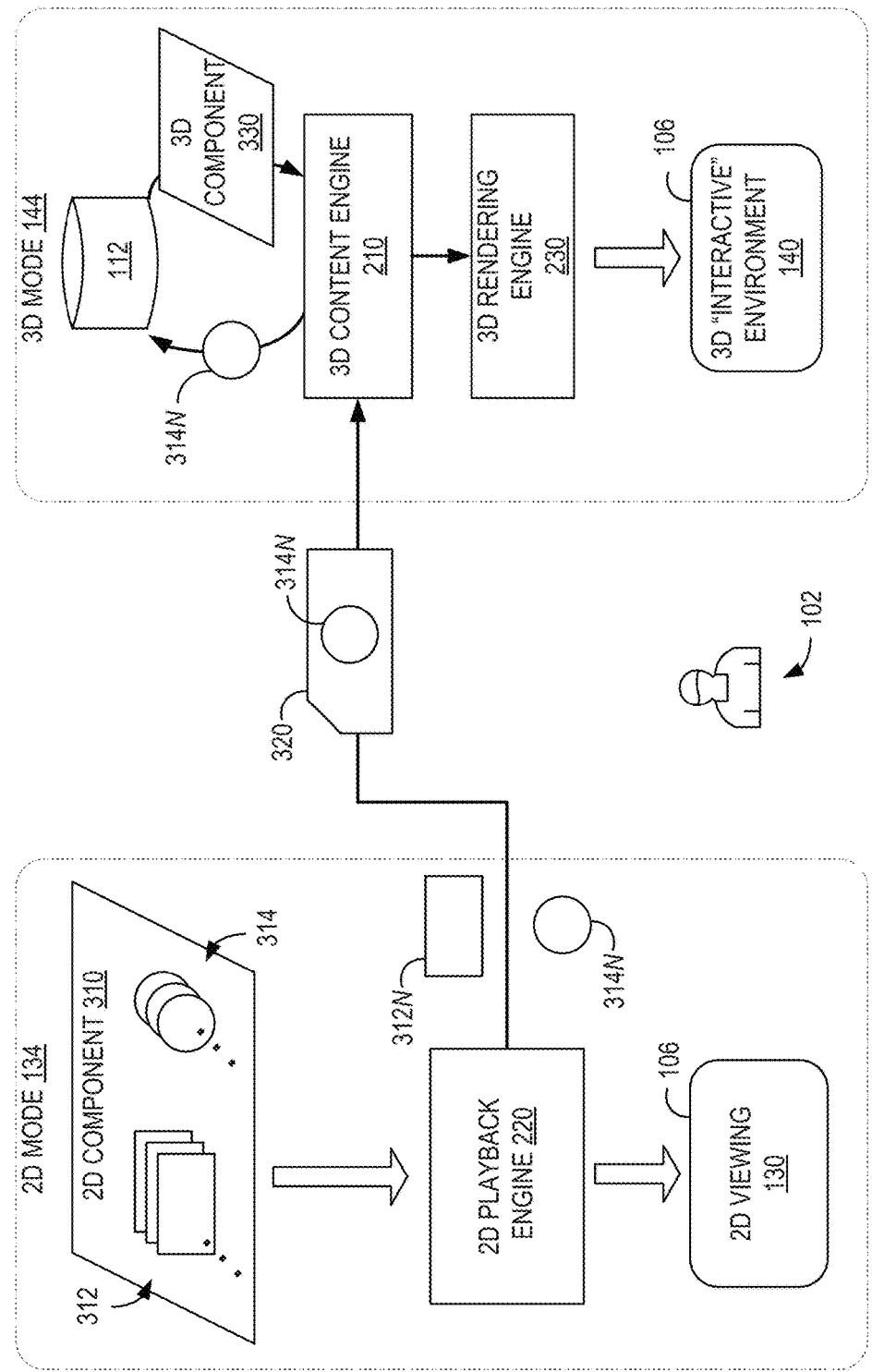
FIG. 3 illustrates a more detailed example transition between the 2D mode and the 3D mode using reference IDs included with a 2D component.

FIG. 3 illustrates a more detailed example transition between the 2D mode 134 and the 3D mode 144 using reference IDs 314 included with a 2D component 310. In the example embodiment, a content item (not separately identified) includes a 2D component 310 and a 3D component 330. The 2D component may be, for example, a 2D video depicting a scene within a house, or rooms within a building. The 2D playback engine 220 receives the 2D component 310 for presentation to the user 102. In some embodiments, the 2D component 310 may be similar to the 2D content 132. In the example embodiment, the 2D component includes a 2D video having an ordered sequence of frames 312. Each of the frames 312 represent a still image at a point in time in the 2D video which, when played by the 2D playback engine 220, are viewable by the user 102 through the 2D viewing 130 on the display 106.

In the example embodiment, the 2D component 310 also includes multiple reference IDs 314. Each reference ID 314 identifies a particular point within the 2D video. In some embodiments, each reference ID 314 is associated with a particular frame 312 (e.g., each frame 312 may have an associated reference ID 314). In some embodiments, each reference ID 314 includes a timecode identifying a playback time within the 2D video, and the timecodes determine the playback times when the 2D video may be interrupted and transitioned into the 3D mode 144. The reference IDs 314 may be provided at every frame 312, or at regular or irregular intervals throughout the 2D video. In some embodiments, multiple frames 312 (e.g., sequential frames, or various non-sequential frames) showing the same or very similar views of a scene may be assigned the same reference ID 314 (e.g., referencing the same 3D component 330 from the database 112), or different timecodes 314 that reference the same 3D component 330 in the database 112. In such cases, the 3D data would be the same for each of the similar frames and, as such, duplication of the data on the server may be reduced, thereby conserving space within the database 112 and improving the efficiency of the system 200.

During operation, the user 102 views the 2D video (e.g., the sequence of frames 312) via the 2D viewing 130 on the display 106, as presented by the 2D playback engine 220 in 2D mode 134. At some point during the 2D viewing 130, a transition event to 3D mode 144 is initiated (e.g., via an input command submitted by the user 102). The control mechanism to initiate the transition event (e.g., via the user interface module 240) may be a mouse, keyboard, touch screen, joystick or any other such object. The playback time at which the transition event is initiated is referred to herein as the "transition time" (e.g., a time within the playback of the 2D video).

At the transition time, in the example embodiment, the 2D playback engine 220 pauses the 2D viewing 130 of the 2D video and identifies the current frame 312N being displayed. The current frame (or "transition frame") 312N is the Nth frame of the set of frames 312 from the 2D video, and represents the frame at which the transition event was initiated.

The 2D playback engine 220 also identifies a particular reference ID (or "transition reference ID") 314N. In the example embodiment, the 2D playback engine 220 identifies the transition reference ID 314N based on the transition frame 312N. For example, each frame 312 may have an associated reference ID 314 and, as such, the transition frame 312N is associated with the transition reference ID 314N. In other embodiments, only certain frames 312 may be associated with reference IDs 314. As such, the 2D playback engine 220 may identify the nearest frame 312 (e.g., nearest previous frame) having an associated reference ID 314, and may use that reference ID 314 as the transition reference ID 314N. In some embodiments, the 2D playback engine 220 may identify the transition reference ID 314N based on the transition time. For example, each reference ID 314 may be associated with a particular playback time in the 2D video, and the 3D playback engine 220 may identify the reference ID 314 at or nearest the transition time (e.g., identifying the first reference ID prior to the transition time), using that reference ID 314 as the transition reference ID 314N. Once the transition reference ID 314N is identified, the 2D playback engine 220 generates a transition initiation message 320 including the transition reference ID 314N and transmits the transition initiation message 320 to the 3D content engine 210 for processing.

The 3D content engine 210 receives the transition initiation message 320 and accesses the 3D component 330 from the database 112 using the transition reference ID 314N. The 3D component 330 may be, for example, 3D data associated with the transition frame 312N, such as object data defining the walls, floors, and other objects within the environment depicted by the 2D video (e.g., at the transition time). The 3D component may include, for example, the geometry, color, texture, and the like of the objects and background within the scene. Further, the 3D component may include a geometry "map" that describes the 3D location and orientation of the objects as well information required for rendering. In other words, the 3D component includes 3D data used to construct the 3D environment 140. The 3D component is stored in the database in an appropriate format (e.g., Filmbox (FBX) file format, VRLM format, or other similar animation or 3D graphics compatible file format).

In the example embodiment, the 3D component 330 is pre-determined, stored in the database 112, and accessed using the transition reference ID 314N. In some embodiments, some or all of the 3D component 330 may be determined at runtime (e.g., at the time of receiving the transition initiation message 320), for example, by extracting 3D object data from the 2D video (e.g., using one or more of the frames 312).

Once identified, the 3D content engine 210 provides the 3D component 330 to the 3D rendering engine 230, which renders the 3D environment 140 using that 3D component 330. The user interface engine 240 (not shown in FIG. 3) manages control of the display 106, coordinates releasing control of the display from the 2D playback engine 220 to the 3D rendering engine 230, and vice-versa, and presents user controls to the user 102 (e.g., for navigation and other functionality within the 3D environment).

After generating the 3D environment 140, the 3D rendering engine 230 fades the view of the 3D environment 140 on top of the stopped 2D viewing 130 (e.g., over the paused transition frame 312N) on the display 106. The view into the 3D environment 140 is constructed using the same resolution, aspect ratios, lighting, and the like from the transition frame 312N such that the view into the 3D environment 140 initially resembles the transition frame 312N and, thus, will appear to have had a smooth transition from the user's perspective. For example, this transition may happen completely in a virtual reality headset wherein the user transitions from watching a 360 degree video to a full 3D virtual reality environment. Once this transition phase is completed, the user 102 may (e.g., through a virtual reality headset, keyboard controls, mouse, or other input devices) move around in all 6 degrees of freedom (e.g., translation and rotation) and explore the scene of the 2D video via the 3D environment 140, linking specific input device controls to movements of a 3D virtual camera that provides the user 102 with a view into the 3D environment 140.

In some embodiments, live actors or objects from the 2D video are composited onto a virtual set background (e.g., using bluescreen or chroma-keying technology). The 3D data of the live actors and objects may be included in the 3D component 330. As such, the 3D component 330 contains both the 3D information for the virtual set and the 3D data (e.g., possibly including animation data) for the live actors and objects from the 2D video. The inclusion of the 3D data of the 2D objects ensures that all the objects in the 2D component 310 (e.g., whether the objects be virtual or live action in origin) are sufficiently characterized such that the objects can be reconstructed in the 3D environment 140 by the 3D rendering engine 230. In such cases, the 3D data of the live actors or objects may consist of, for example, rotoscopic bitmap or volumetric data representations, motion capture data, or other 3D data formats. The rotoscopic bitmap or other volumetric information may be provided by the author of the 2D video, and may be obtained using specialized cameras that record on virtual reality filming sets, possibly using chroma-keying technology. Alternately, the rotoscopic bitmap or volumetric data can be extracted directly from the 2D video frames, post recording, using known algorithms that are capable of extracting 3D information from a 2D video stream.

In some embodiments, additional data may be provided with each reference ID 314 including, for example, instructions for the 2D playback engine 220 on how to use the reference IDs (e.g., how to select the particular transition reference ID 314N), or special 3D navigational tools or viewing modes that can be used within the 3D environment 140 associated with that particular reference ID 314.

Figure 4A:
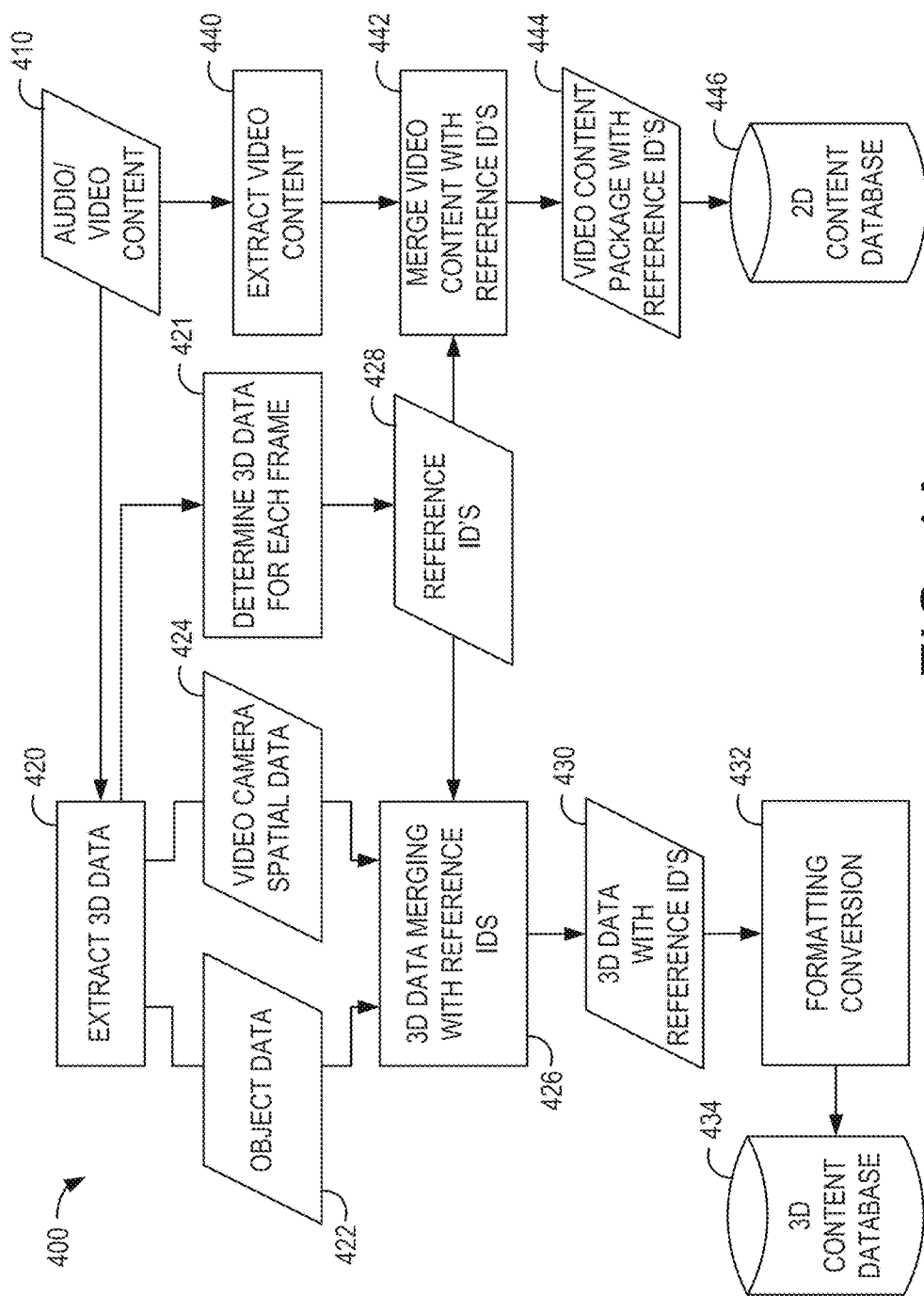
FIGS. 4A, 4B, and 4C illustrate three methods for preparing 2D content and 3D content for use during transition events.
Figure 4B:
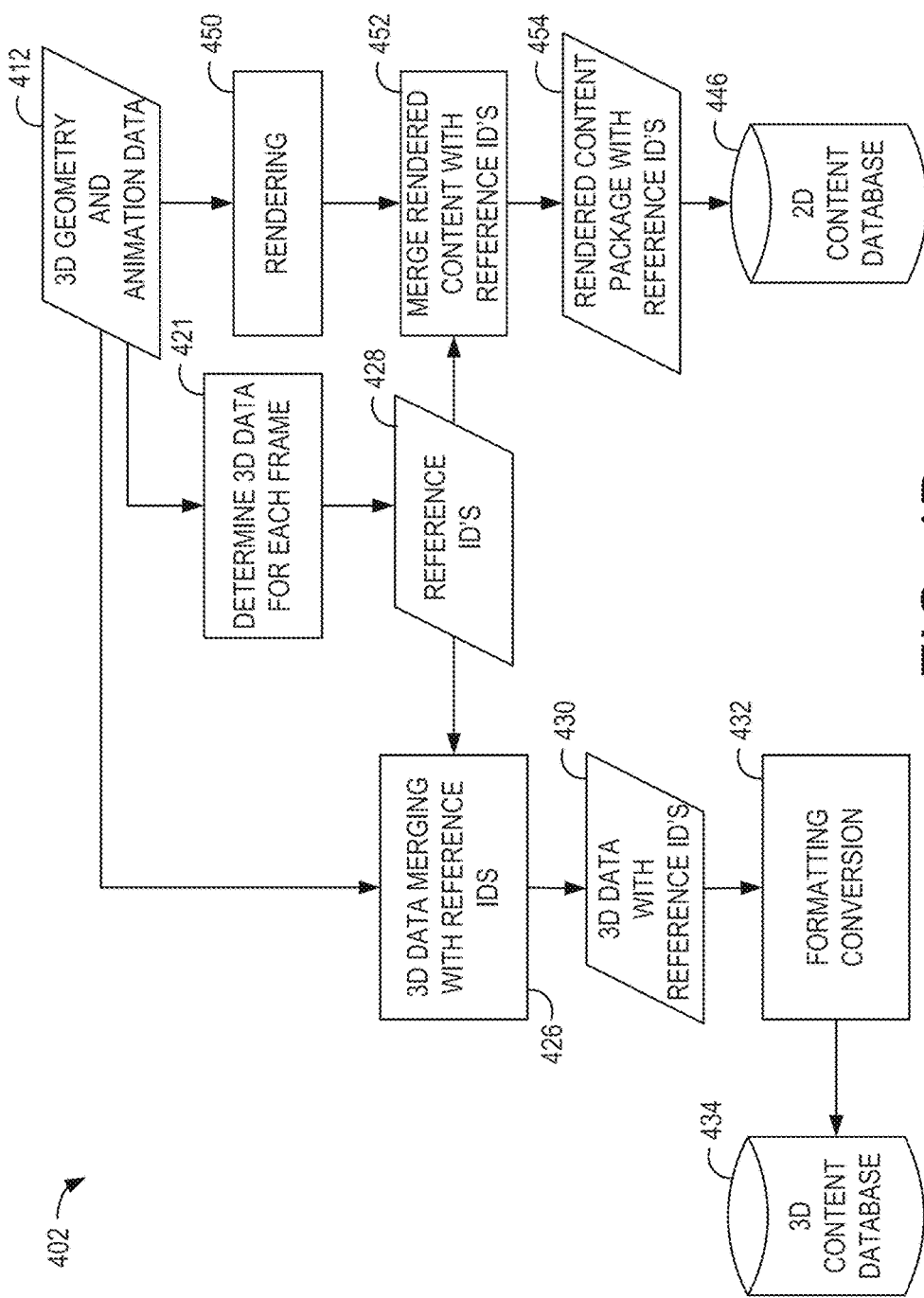
Figure 4C:
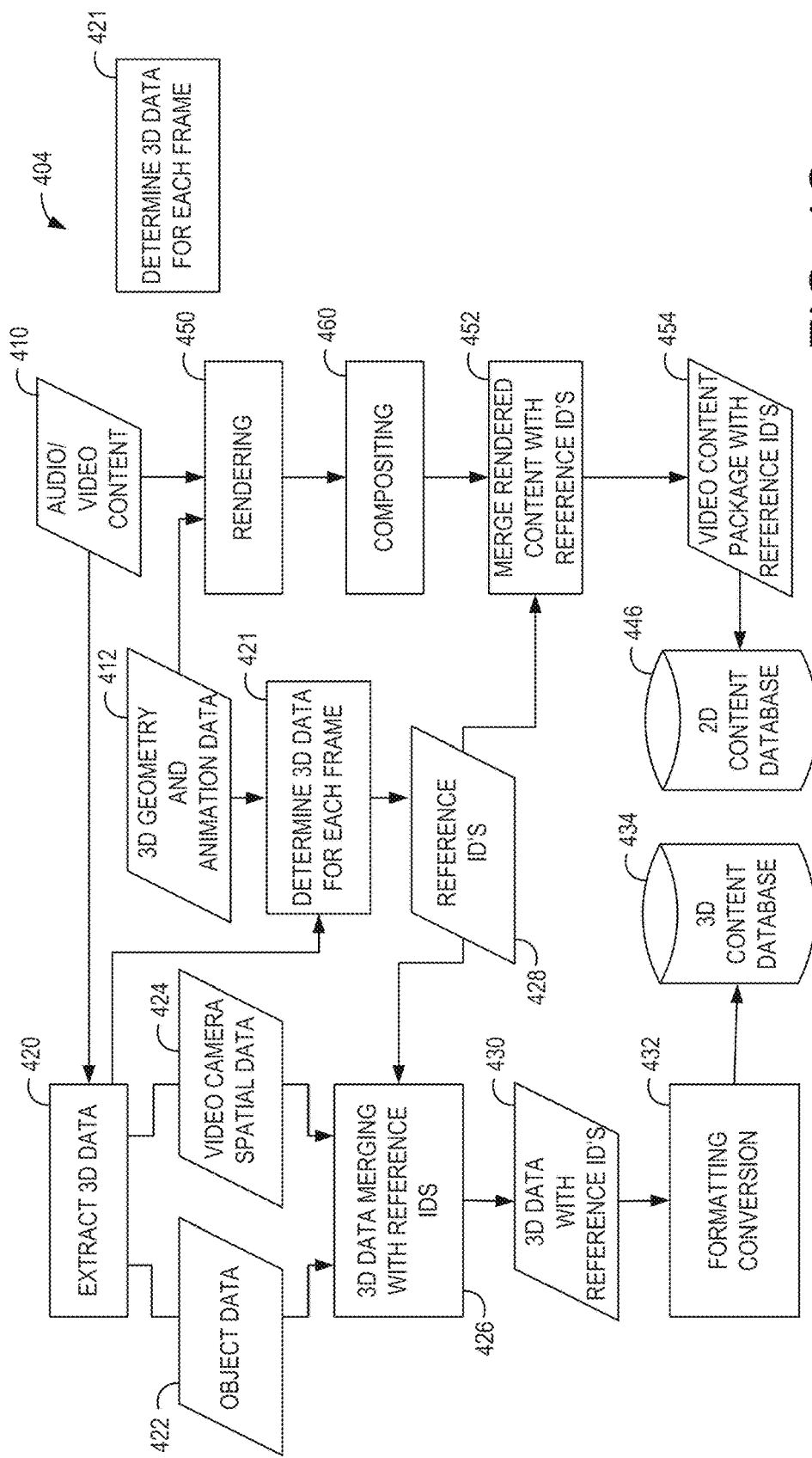

FIGS. 4A, 4B, and 4C illustrate three methods 400, 402, 404 for preparing 2D content 132 and 3D content 142 for use during transition events. More specifically, the method 400 in FIG. 4A starts with an audio/video content item 410 (e.g., a 2D video with audio), the method 402 in FIG. 4B starts with 3D geometry and animation data 412 (e.g., animation data for animated 3D content, geometry describing the shapes of objects, and animation data (e.g., keyframes) describing the animation of those 3D objects), and the method 404 in FIG. 4C starts with both the audio/video content item 410 and the 3D geometry and animation data 412 (e.g., a composite of 2D video and animated content). Further, in the example embodiments, the generated 2D content 132 and 3D content 142 is stored in a 2D content database 446 and a 3D content database 434, respectively. The databases 434, 446 may be similar to the database 112. In other embodiments, the 2D content 132 and 3D content 142 may, alternatively, be generated at runtime (e.g., at the time of 2D viewing 130 or transitioning to the 3D environment 140). Many of the elements of the methods 400, 402, 404 and associated data elements are similar and, as such, use like numbering in the figures. Further, each of the elements of the method 400, 402, 404 are performed by components of the playback system 200 (e.g., the 3D content engine 210, perhaps executing on a server (not shown) remote from the personal computing device 104 of the user 102).

Referring now to FIG. 4A, the method 400 starts with the audio/video content item 410 (e.g., "live action" 2D video from a live camera recording, or a 2D computer-generated video). In the example embodiment, the playback system 200 prepares 3D data for use during transition events. More specifically, the method 400 includes extracting 3D data from the audio/video content item 410 (see operation 420). This 3D data includes object data 422 (e.g., a Rotoscopic bitmap, polygonal mesh, texture data, and the like) and video camera spatial data 424 (e.g., positional data of the video camera while filming the audio/video content item 410). The 3D data may include, for example, information related to the camera that recorded the said live action video such as camera focus, camera angle, camera lens, camera position on the set relative to the 'bluescreen' and the camera position relative to the actors and objects within the scene. The 3D data may also include information describing the objects and actors in the audio/video content item 410. This information may be used by the playback system 200 to reconstruct 3D objects, and may be, for example, information on rotoscopic bitmaps, volumetric data, motion capture data, or information from a motion tracking device (e.g., Kinect®). The 3D data may be obtained, for example, through virtual reality filming techniques where the camera records 3D data along with live action video.

In some embodiments, the audio/video content item 410 may include 3D data (e.g., 3D data gathered at the time of filming, such as by motion capture filming, VR filming, Kinect filming), such as camera position data, or data on position/motion of objects tracked via motion capture. In other embodiments, the 3D data may be extracted via analysis of the 2D video, with 3D object extraction techniques.

At operation 421, the playback system 200 determines which frames get reference IDs 428, and how they are linked to the 3D data (e.g., which objects are in that particular frame). In some embodiments, the playback system 200 determines scene breaks and associated objects within that scene, or changes within a particular scene (e.g., if a character is only available in the second part of the scene, then one reference ID may be used for the first part of the scene and a second reference ID may be used for the second part of the scene). In some embodiments, the authors of the audio/video content item 410 may identify markers for the reference IDs 428.

At operation 426, the playback system 200 combines (e.g., merges) the 3D data with reference IDs 428. Each reference ID 428 links the 3D data to correspond to particular 2D frames. As such, when a request for 3D data comes in, the 3D data may be retrieved using the particular reference ID 428. The reference IDs 428 may be similar to the reference IDs 314. The combining at operation 426 results in 3D data with reference IDs 430. At operation 432, the 3D data with reference IDs 430 may go through a formatting conversion 432 before being stored in the 3D content database 434 (e.g., encoded in a single file format such as the FBX file format, VRLM format, or any other such similar compatible file format). This stored 3D content in the 3D content database 434 may be similar to the 3D content 142, or the 3D component 330.

Further, the playback system 200 also prepares 2D data to facilitate transition events. More specifically, method 400 includes extracting video content from the audio/video content item 410 (see operation 440). Operation 440 strips away any of the 3D data (e.g., motion capture, Kinect, VR data) that may have been included in the original content, and produces just 2D video data that the user 102 may download and view. The extracted 2D video is then merged with the reference ID's 428. For example, each frame 312 of the 2D video may be associated with a reference ID 428, and the associated 3D data for that frame 312 is also associated with the same reference ID 428 (e.g., as the 3D data with reference ID 430). As such, in the example embodiment, each of the 2D frames are combined with their own reference ID 428 into a video content package with reference IDs 444 and stored in the 2D content database 446. The video content package with reference IDs 444 may be similar to the 2D component 310 and the 2D content 132. These methods 400, 402, 404 are performed such that various elements or positions within the 2D content (e.g., frames of the audio/video content item 410) are associated with various 3D data (e.g., for objects appearing within the 2D content) by the reference IDs 428.

Referring now to FIG. 4B, the method 402 starts with the 3D geometry and animation data 412 (e.g., animation data for animated 2D content). In the example embodiment, the 3D geometry and animation data 412 are merged with the reference ID's 428, formatted, and stored in the 3D content database 434 (e.g., similar to the 3D data of the method 400), thereby generating the 3D content 142 or the 3D component 330.

Further, the 3D geometry and animation data 412 are rendered 450 (e.g., by the 3D rendering engine 230) to generate rendered content (e.g., computer generated imagery (CGI) video). The rendered content is then merged with the reference ID's 428 at operation 452 (e.g., similar to the merging at operation 442) to generate a rendered content package with reference ID's 454 (e.g., similar to the packaging 444), which is then stored in the 2D content database 446. The rendered content package with reference IDs 444 may be similar to the 2D component 310 or the 2D content 132.

Referring now to FIG. 4C, the method 404 starts with both the audio/video content item 410 and the 3D geometry and animation data 412 (e.g., 2D video with object data and animation data). The 3D data associated with the audio/video content item 410 (e.g., object data 422 and video camera spatial data 424) is extracted at operation 420. Further, in this method 404, the 3D data also includes the 3D geometry and animation data 412 (e.g., extra 3D data including characters and objects that are to be added to the audio/video content item 410). At operation 426, the 3D data is merged with the reference ID's (e.g., as described above, but additionally with the 3D geometry and animation data 412), formatted at operation 432 and stored in the 3D content database 434. As such, the 3D content 142 includes both 3D data for video content as well as 3D data for animated content.

Further, the 3D geometry and animation data 412 (e.g., scene animations) are rendered into a video format at operation 450. The rendered video is then composited with the audio/video content item 410 (e.g., the 2D video) to form a composite of 3D animation and live video at operation 460. Therefore the composited video may contain objects from both the 2D video and the animations. The composited video is then merged with the reference IDs 428 at operation 452, packaged 454, and stored in the 2D content database 446 (e.g., similar to method 402).

Figure 5:
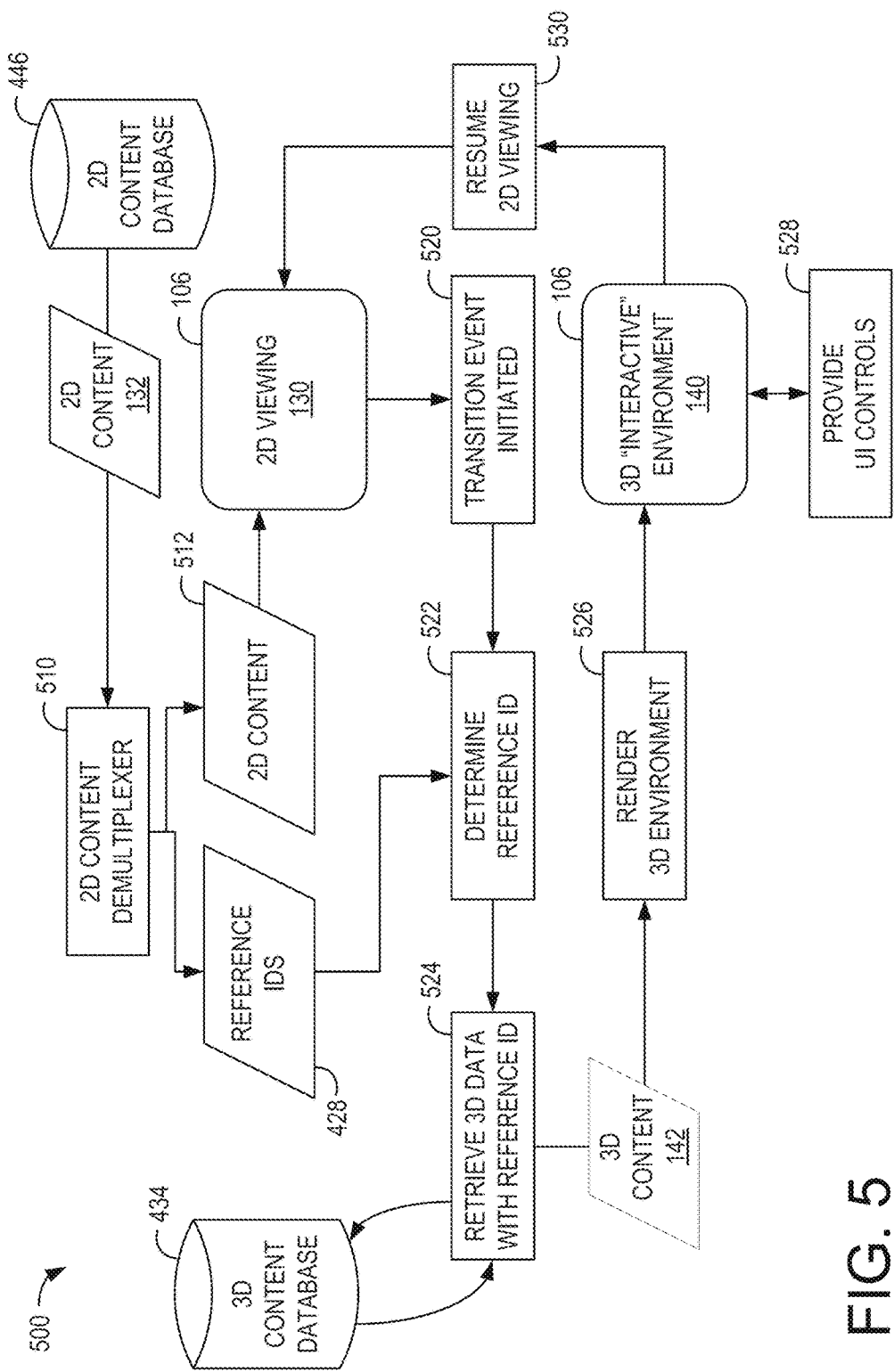
FIG. 5 illustrates a method for transitioning between 2D mode and 3D mode (e.g., during 2D viewing)

FIG. 5 illustrates a method 500 for transitioning between 2D mode 134 and 3D mode 144 (e.g., during 2D viewing 130). The user 102 may be given the opportunity to choose and download the 2D content 132 (e.g., an episode from the 2D content database 446). The method 500 retrieves 2D content 132 from the 2D content database 446. The 2D content 132 may be similar to the package 444, or the package 454. The 2D content 132 is demultiplexed at operation 510, into 2D content 512 (e.g., 2D video) and associated reference ID's 428 (e.g., to separate the episode video content from the episode reference IDs). The 2D content 512 is presented to the user 102 via the 2D viewing 130 on the display 106, and may be converted into a final video file format that is compatible with the display 106.

During the 2D viewing 130, a transition event is initiated at operation 520 (e.g., at a transition time within the 2D content 512). At operation 522, a transition reference ID 314N is identified (e.g., using the reference ID's 428). At operation 524, 3D content 142 is retrieved from the 3D content database 434. The 3D content 142 may be similar to the 3D data with reference IDs 430 (e.g., after formatting conversion), or the 3D component 330. Using the 3D content 142, the 3D environment 140 is rendered at operation 526 and presented to the user 102. At operation 528, user interface controls are provided to the user 102 (e.g., for navigating within the 3D environment 140).

The 3D content database 434 is made accessible to the user 102, enabling the user 102 to download the 3D data when they initiate a transition event and request a transition to the 3D environment 140. The information in the database 434 is referenced via the reference IDs 428 such that the user 102 may request and download the data corresponding to a particular scene which they have chosen to explore in a 3D environment 140 by initiating the transition event during 2D video playback, the scene being identified by its timecode.

Once the user 102 has finished navigating through the 3D environment 140, the 2D viewing 130 may be resumed at operation 530 (e.g., from the point at which it was interrupted). A transition back from the 3D environment 140 to the frozen frame of the 2D video is performed, then entering the 2D mode 134 where the user 102 would have the option of reinitiating another transition event when desired.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 6:
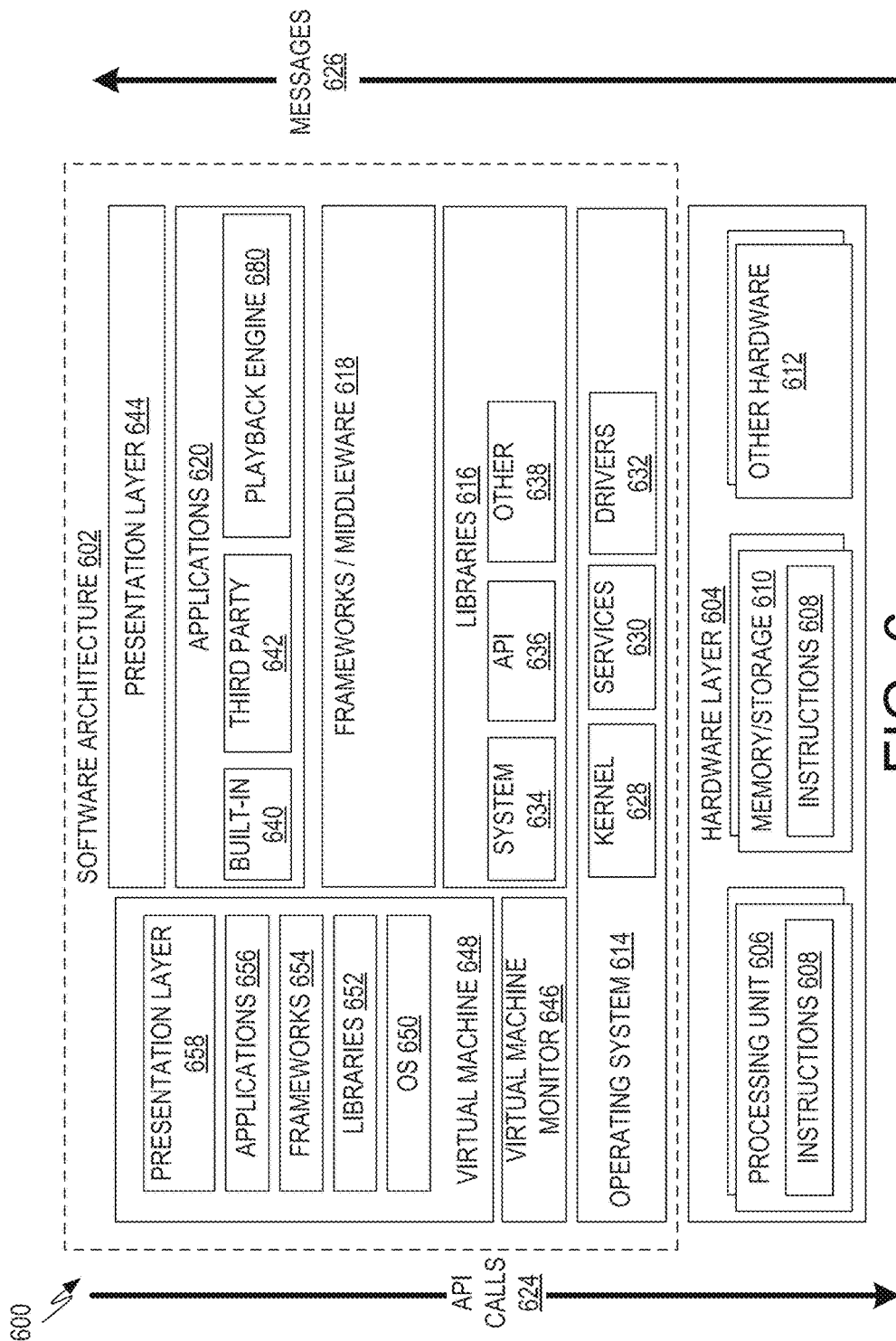
FIG. 6 is a block diagram illustrating an example software architecture 602, which may be used, in conjunction with various hardware architectures herein described, to provide transitioning between 2D environments (e.g., the 2D mode) and 3D environments (e.g., the 3D mode)

FIG. 6 is a block diagram 600 illustrating an example software architecture 602, which may be used, in conjunction with various hardware architectures herein described, to provide transitioning between 2D environments (e.g., the 2D mode 134) and 3D environments (e.g., the 3D mode 144). A playback engine 680, which is shown in a layer of applications 620, may be similar to the playback system 200, or any of the various components thereof, but may be provided in whole or in part at other layers shown in FIG. 6. FIG. 6 is a non-limiting example of a software architecture 602, and it will be appreciated that many other architectures may be implemented to facilitate the functionality described herein. The software architecture 602 may execute on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 includes a processing unit 606 having associated executable instructions 608. The executable instructions 608 represent the executable instructions of the software architecture 602, including implementation of the methods, modules, and so forth described herein. The hardware layer 604 also includes memory/storage 610, which also includes the executable instructions 608. The hardware layer 604 may also comprise other hardware 612.

In the example architecture of FIG. 6, the software architecture 602 may be conceptualized as a stack of layers where each layer provides particular functionality. For example, the software architecture 602 may include layers such as an operating system 614, libraries 616, frameworks or middleware 618, applications 620, and a presentation layer 644. Operationally, the applications 620 and/or other components within the layers may invoke application programming interface (API) calls 624 through the software stack and receive a response as messages 626. The layers illustrated are representative in nature and not all software architectures 602 have all layers. For example, some mobile or special purpose operating systems 614 may not provide the frameworks/middleware 618, while others may provide such a layer. Other software architectures 602 may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 616 may provide a common infrastructure that may be used by the applications 620 and/or other components and/or layers. The libraries 616 typically provide functionality that allows other software modules to perform tasks in an easier fashion than by interfacing directly with the underlying operating system 614 functionality (e.g., kernel 628, services 630, and/or drivers 632). The libraries 616 may include system libraries 634 (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules.

The frameworks 618 (also sometimes referred to as middleware) provide a higher-level common infrastructure that may be used by the applications 620 and/or other software components/modules. For example, the frameworks/middleware 618 may provide various graphic user interface (GUI) functions, high-level resource management, high-level location services, and so forth. The frameworks/ middleware 618 may provide a broad spectrum of other APIs that may be utilized by the applications 620 and/or other software components/modules, some of which may be specific to a particular operating system 614 or platform.

The applications 620 include built-in applications 640 and/or third-party applications 642. Examples of representative built-in applications 640 may include, but are not limited to, a contacts application, a browser application, a book reader application, a location application, a media application, a messaging application, and/or a game application. The third-party applications 642 may include an application developed using the Android™ or iOS™ software development kit (SDK) by an entity other than the vendor of the particular platform, and may be mobile software running on a mobile operating system 614 such as iOS™, Android™, Windows® Phone, or other mobile operating systems 614. The third-party applications 642 may invoke the API calls 624 provided by the mobile operating system, such as the operating system 614, to facilitate functionality described herein.

The applications 620 may use built-in operating system functions (e.g., kernel 628, services 630, and/or drivers 632), libraries 616, or frameworks/middleware 618 to create user interfaces to interact with users of the system. Alternatively, or additionally, in some systems, interactions with a user may occur through a presentation layer, such as the presentation layer 644. In these systems, the application/module "logic" can be separated from the aspects of the application/ module that interact with a user.

Some software architectures 602 use virtual machines. In the example of FIG. 6, this is illustrated by a virtual machine 648. The virtual machine 648 creates a software environment where applications/modules can execute as if they were executing on a hardware machine (such as the machine 700 of FIG. 7, for example). The virtual machine 648 is hosted by a host operating system (e.g., operating system 614) and typically, although not always, has a virtual machine monitor 646, which manages the operation of the virtual machine 648 as well as the interface with the host operating system (i.e., operating system 614). A software architecture executes within the virtual machine 648, such as an operating system (OS) 650, libraries 652, frameworks 654, applications 656, and/or a presentation layer 658. These layers of software architecture executing within the virtual machine 648 can be the same as corresponding layers previously described or may be different.

Figure 7:
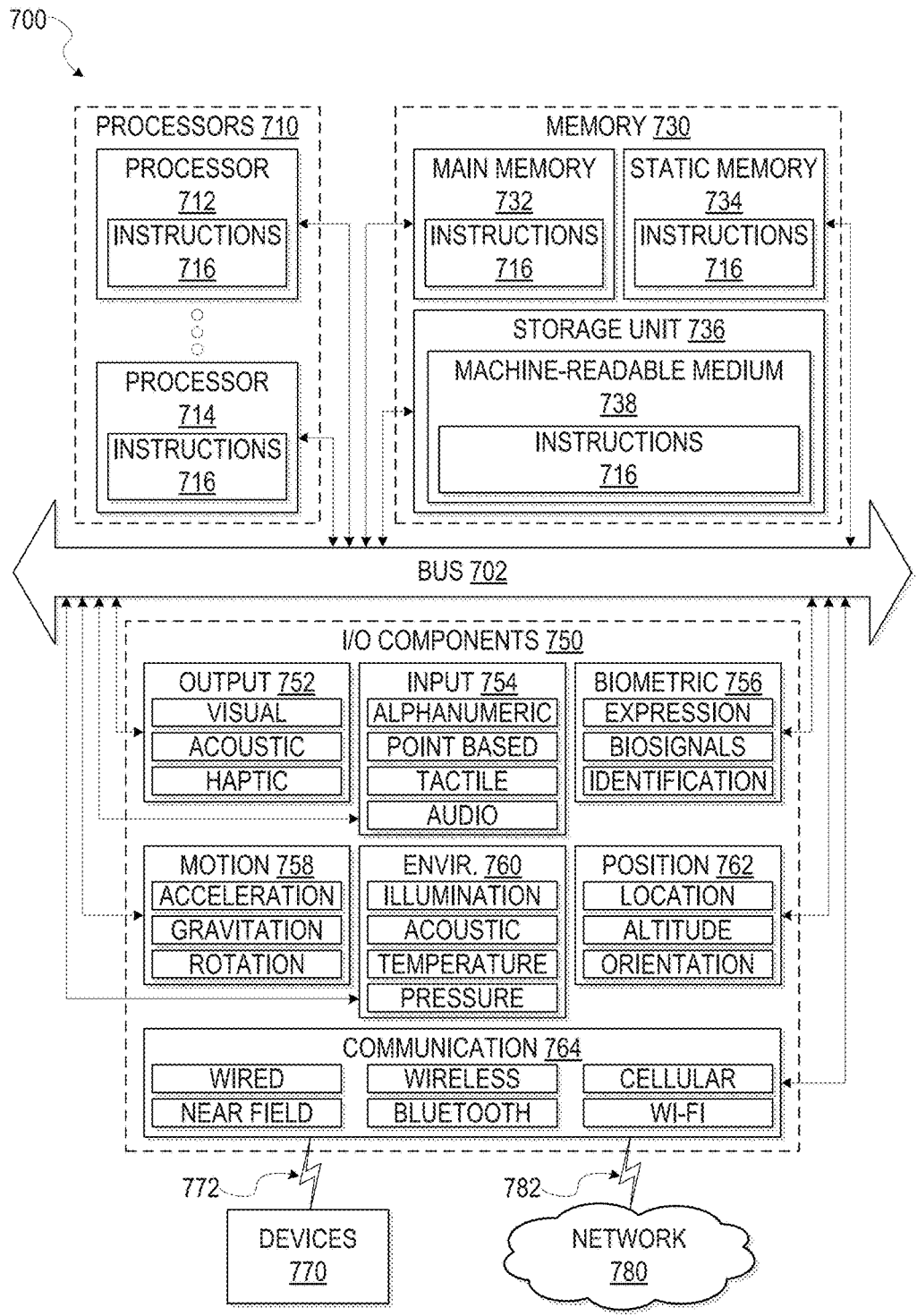
FIG. 7 is a block diagram illustrating components of a machine, according to some example embodiments, configured to read instructions from a machine-readable medium (e.g., a machine-readable storage medium) and perform any one or more of the methodologies discussed herein.

FIG. 7 is a block diagram illustrating components of a machine 700, according to some example embodiments, configured to read instructions 716 from a machine-readable medium 738 (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. As such, the instructions 716 may be used to implement modules or components described herein. The instructions 716 transform the general, non-programmed machine 700 into a particular machine programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a personal digital assistant (PDA), a cellular telephone, a smart phone, a mobile device, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and input/output (I/O) components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a GPU, a digital signal processor (DSP), an ASIC, a radio-frequency integrated circuit (RFIC), another processor, or any suitable combination thereof) may include, for example, a processor 712 and a processor 714 that may execute the instructions 716. The term "processor" is intended to include a multi-core processor 712 that may comprise two or more independent processors 712, 714 (sometimes referred to as "cores") that may execute the instructions 716 contemporaneously. Although FIG. 7 shows multiple processors 712, 714, the machine 700 may include a single processor 712 with a single core, a single processor 712 with multiple cores (e.g., a multi-core processor), multiple processors 712, 714 with a single core, multiple processors 712, 714 with multiples cores, or any combination thereof.

The memory/storage 730 may include a memory, such as a main memory 732, a static memory 734, or other memory, and a storage unit 736, both accessible to the processors 710 such as via the bus 702. The storage unit 736 and memory 732, 734 store the instructions 716 embodying any one or more of the methodologies or functions described herein. The instructions 716 may also reside, completely or partially, within the memory 732, 734, within the storage unit 736, within at least one of the processors 710 (e.g., within the processor's cache memory), or any suitable combination thereof, during execution thereof by the machine 700. Accordingly, the memory 732, 734, the storage unit 736, and the memory of the processors 710 are examples of machine-readable media 738.

As used herein, "machine-readable medium" means a device able to store the instructions 716 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions 716, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 750 may include a wide variety of components to receive input, provide output, produce output, transmit information, exchange information, capture measurements, and so on. The specific I/O components 750 that are included in a particular machine 700 will depend on the type of machine. For example, portable machines 700 such as mobile phones will likely include a touch input device or other such input mechanisms, while a headless server machine 700 will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 750 may include biometric components 756, motion components 758, environmental environment components 760, or position components 762 among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 may include acceleration sensor components (e.g., accelerometer), gravitation sensor components, rotation sensor components (e.g., gyroscope), and so forth. The environmental environment components 760 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772 respectively. For example, the communication components 764 may include a network interface component or other suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine 700 or any of a wide variety of peripheral devices (e.g., a peripheral device coupled via a USB).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

While illustrated in the Figures as groups of discrete components communicating with each other via distinct data signal connections, it should be noted that such components are in one embodiment, provided by a combination of hardware and software components, with some components being implemented by a given function or operation of a hardware or software system. In addition, many of the data paths illustrated are implementable by data communication occurring within a computer application or an operating system or over a network. The structure of the systems illustrated in Figures is thus provided for efficiency of teaching.

While illustrated in the block diagrams as groups of discrete components communicating with each other via distinct data signal connections, it will be understood by those skilled in the art that the example embodiments described herein are provided by a combination of hardware and software components, with some components being implemented by a given function or operation of a hardware or software system, and many of the data paths illustrated being implemented by data communication within a computer application or operating system. The example structure illustrated may provide for efficiency of teaching the example embodiments described herein.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

The invention claimed is:

1. A system comprising:
one or more hardware processors;
a display device;
a memory storing 2-dimensional (2D) content and 3-dimensional (3D) model data associated with a an immersive video; and
a playback engine that includes a 2D playback engine and a 3D content engine, executable by the one or more hardware processors, configured to perform operations for presenting the immersive video on the display device, the operations comprising:
receiving the 2D content;
playing, using the 2D playback engine, the 2D content on the display device;
during the playing of the 2D content, receiving an indication of a transition event, the transition event having been initiated on-demand by a user;
in response to the receiving of the indication of the transition event, pausing the playing of the 2D content, identifying a transition reference identifier (ID) based on a frozen frame of the 2D content, identifying the 3D model data based on the transition reference ID,
transitioning the display device into a 3D mode, the transitioning including providing, using the 3D content engine and the 3D model data, a 3D environment in which the user can navigate with respect to the 3D model data, the navigating including changing a view position or orientation in six degrees of freedom among objects that were depicted in the 2D content; and
in response to the user finishing the navigating, transitioning back to the frozen frame of the 2D content and resuming the playing back of the 2D content.

2. The system of claim 1, wherein the transition event is initiated at a transition time during the displaying of the 2D content, wherein the 3D environment is an approximate 3D representation of the 2D content at the transition time.

3. The system of claim 1, further comprising:
an input device; and
a user interface engine, executable by the one or more hardware processors, configured to perform operations comprising:
providing user interface controls to the user within the 3D environment, the user interface controls being responsive to the input device, the user interface controls including navigation controls associated with one or more of a position and an orientation of a virtual camera within the 3D environment, the 3D content engine rendering the 3D model data from the viewpoint of the virtual camera as the user moves the virtual camera.

4. The system of claim 1, wherein the 2D content includes a 2D video having a plurality of frames, wherein each frame of the plurality of frames is associated with a single transition reference ID.

5. The system of claim 4, wherein the transition reference ID is associated with a transition frame, wherein the transition event is initiated at a transition time during the displaying of the 2D content, wherein determining the transition reference ID further includes:
determining the transition frame based on a transition time; and
determining the transition reference ID based on the determining the transition frame and the association between the transition frame and the transition reference ID.

6. The system of claim 1, further comprising:
a 3D content engine, executable by the one or more hardware processors, configured to perform operations comprising:
generating one or more reference IDs;
associating the one or more reference IDs with the 3D model data; and
associating the one or more reference IDs with the 2D content, wherein the identifying the 3D model data further includes the 3D content engine providing the 3D model data to the playback engine in response to the transition event.

7. A computer-implemented method comprising:
performing operations for presenting an immersive video on a display device, the immersive video associated with 2D content and 3D model data, the operations comprising:
receiving the 2D content;
playing, using a 2D playback engine, the 2D content on a display device;
during the playing of the 2D content, receiving an indication of a transition event, the transition event having been initiated on-demand by a user;
in response to the receiving of the indication of the transition event, pausing the playing of the 2D content, identifying a transition reference identifier (ID) based on a frozen frame of the 2D content, identifying the 3D model data based on the transition reference ID,
transitioning the display device into a 3D mode, the transitioning including providing, using a 3D content engine and the 3D model data, a 3D environment in which the user can navigate with respect to the 3D model data, the navigating including changing a view position or orientation in six degrees of freedom among objects that were depicted in the 2D content; and in response to the user finishing the navigating, transitioning back to the frozen frame of the 2D content and resuming the playing back of the 2D content.

8. The method of claim 7, wherein the transition event is initiated at a transition time during the displaying of the 2D content, wherein the 3D environment is an approximate 3D representation of the 2D content at the transition time.

9. The method of claim 7, further comprising:

providing user interface controls to the user within the 3D environment, the user interface controls being responsive to an input device, the user interface controls including navigation controls associated with one or more of a position and an orientation of a virtual camera within the 3D environment, the 3D engine rendering the 3D model data from the viewpoint of the virtual camera as the user moves the virtual camera.

10. The method of claim 7, wherein the 2D content includes a 2D video having a plurality of frames, wherein each frame of the plurality of frames is associated with a single transition reference ID.

11. The method of claim 10, wherein the transition reference ID is associated with a transition frame, wherein the transition event is initiated at a transition time during the displaying of the 2D content, wherein determining the transition reference ID further includes:

determining the transition frame based on a transition time; and determining the transition reference ID based on the determining the transition frame and the association between the transition frame and the transition reference ID.

12. The method of claim 7, further comprising:

generating one or more reference IDs;

associating the one or more reference IDs with the 3D model data; and associating the one or more reference IDs with the 2D content, wherein the identifying the 3D content further includes providing the 3D model data in response to the transition event.

13. A non-transitory machine-readable medium storing processor-executable instructions which, when executed by a processor, cause the processor to perform operations for presenting an immersive video on a display device, the immersive video associated with 2D content and 3D model data, the operations comprising:

receiving the 2D content;

playing, using a 2D playback engine, the 2D content on the display device;

during the playing of the 2D content, receiving an indication of a transition event, the transition event having been initiated on-demand by a user;

in response to the receiving of the indication of the transition event, pausing the playing of the 2D content, identifying a transition reference identifier (ID) based on a frozen frame of the 2D content, identifying the 3D model data based on the transition reference ID, transitioning the display device into a 3D mode, the transitioning including providing, using a 3D content engine and the 3D model data, a 3D environment in which the user can navigate with respect to the 3D model data, the navigating including changing a view position or orientation in six degrees of freedom among objects that were depicted in the 2D content; and in response to the user finishing the navigating, transitioning back to the frozen frame of the 2D content and resuming the playing back of the 2D content.

14. The machine-readable medium of claim 13, wherein the transition event is initiated at a transition time during the displaying of the 2D content, wherein the 3D environment is an approximate 3D representation of the 2D content at the transition time.

15. The machine-readable medium of claim 13, wherein the processor-executable instructions further cause the processor to perform operations comprising:

providing user interface controls to the user within the 3D environment, the user interface controls being responsive to an input device, the user interface controls including navigation controls associated with one or more of a position and an orientation of a virtual camera within the 3D environment, the 3D engine rendering the 3D model data from the viewpoint of the virtual camera as the user moves the virtual camera.

16. The machine-readable medium of claim 13, wherein the 2D content includes a 2D video having a plurality of frames, wherein each frame of the plurality of frames is associated with a single transition reference ID of the one or more reference IDs.

17. The machine-readable medium of claim 13, wherein the transition reference ID is associated with a transition frame, wherein the transition event is initiated at a transition time during the displaying of the 2D content, wherein determining the transition reference ID further includes:

determining the transition frame based on a transition time; and determining the transition reference ID based on the determining the transition frame and the association between the transition frame and the transition reference ID.

* * * * *

UNITED STATES PATENT AND TRADEMARK OFFICE
CERTIFICATE OF CORRECTION

PATENT NO. : 10,306,292 B2
APPLICATION NO. : 15/080536
DATED : May 28, 2019
INVENTOR(S) : Sylvio Herve Drouin Page 1 of 1

It is certified that error appears in the above-identified patent and that said Letters Patent is hereby corrected as shown below:

In the Claims

Column 19, Line 40, in Claim 1, after "with", delete "a"

Column 19, Line 57, in Claim 1, delete "ID," and insert --ID;-- therefor

Column 20, Line 62, in Claim 7, delete "ID," and insert --ID;-- therefor

Column 22, Line 8, in Claim 13, delete "ID," and insert --ID;-- therefor

Signed and Sealed this
Twelfth Day of May, 2020

Andrei Iancu
*Director of the United States Patent and Trademark Office*